U. WASSMER & W. P. YOE.
Baking-Pan.

No. 218,411. Patented Aug 12, 1879.

UNITED STATES PATENT OFFICE.

ULRICH WASSMER AND WILLIAM P. YOE, OF CINCINNATI, OHIO, ASSIGNORS TO SAID WASSMER.

IMPROVEMENT IN BAKING-PANS.

Specification forming part of Letters Patent No. 218,411, dated August 12, 1879; application filed January 22, 1879.

*To all whom it may concern:*

Be it known that we, ULRICH WASSMER and WILLIAM P. YOE, of Cincinnati, in the county of Hamilton and State of Ohio, have invented certain new and useful Improvements in Baking-Pans, of which the following is a specification.

Our invention relates to baking utensils; and consists, first, in the arrangement of two pans of unequal sizes, one within the other, the smaller having perforations around its upper edge, and an outward and downward bent flange, which maintains said edge in a concentric position with relation to the other pan, said pans having thus a chamber between them, and communicating with the pan, for the circulation of heated air, which prevents the article being cooked from burning, which it is liable to when cooked in a single pan brought into direct contact with the heat, these pans being provided with a closely-fitting cap, so arranged as to permit the heated air to be brought into direct contact with the article being cooked, and at the same time prevent the gases or vapor arising from the said article from escaping, thus insuring a perfect cooking.

Figure 1:
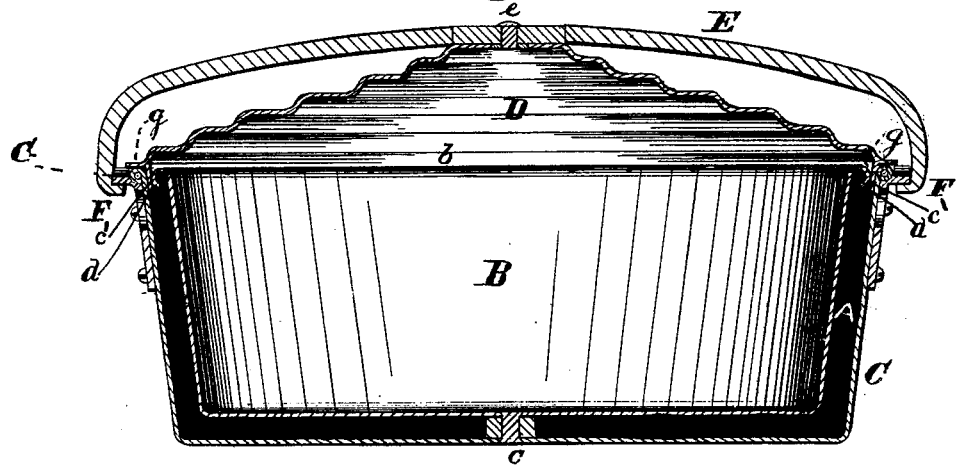
Figure 2:
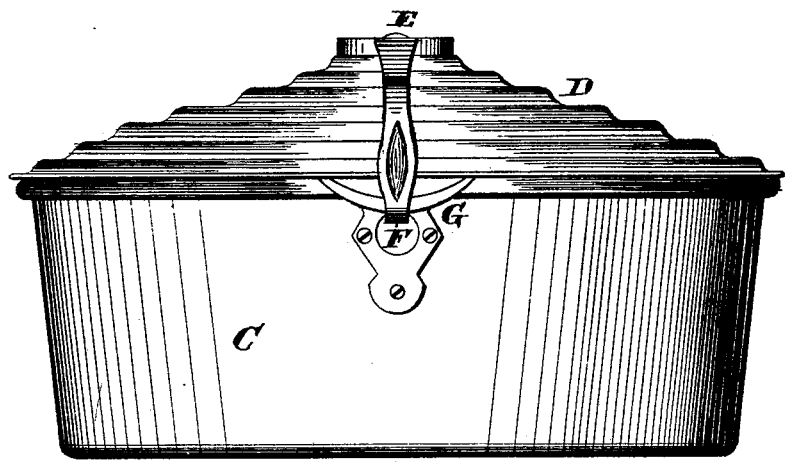

In the accompanying drawings, Figure 1 is a vertical sectional elevation of a baking utensil of our invention, and Fig. 2 is a transverse vertical elevation of the same.

Letters of like character represent corresponding parts in each of the figures.

The interior pan or baking-chamber, B, has perforations $b$ around its top edge, for the introduction of heated air from chamber A, formed between the pans B and C, which are united by means of a washer and rivet, $c$, and closely covered by a corrugated spring-lid, D, so arranged as to be firmly secured to the double pans, and form a sufficiently-tight joint to prevent the escape of gases and vapor arising from the article being cooked, causing them to be retained in the close chambers, and finally returned, or partially so, to their original source, thus saving some of the most nutritious portions, which would otherwise pass away in vapor, and imparting uniform and moist heat to the articles being cooked.

The inner pan, B, has at its upper edge an outward and downward curved flange, $c'$, which maintains the upper edge of said pan in a concentric position with relation to the outer pan, and between this flange and the outer pan fits the downward flange $d$ of the lid. This flange $c'$ also permits the air heated in the chamber A from rising into the concavity of the lid except by first passing through the inner pan, and assisting by direct contact in the cooking of the article therein.

Having thus described our invention, what we claim as new, and desire to secure by Letters Patent, is—

The combination, with the pan C, of the inner centrally-supported pan, D, having the bent-over flange $c'$ and perforations $b$, and the lid D, having the downward flange $d$, substantially as and for the purpose set forth.

In testimony whereof we have hereunto set our hands this 6th day of November, 1877.

ULRICH WASSMER.
WILLIAM P. YOE.

Witnesses:
HENRY MILLWARD,
EUGENE W. LIPPERT.